US 11,473,515 B2

(12) United States Patent
Norton et al.

(10) Patent No.: US 11,473,515 B2
(45) Date of Patent: Oct. 18, 2022

(54) MULTI-FUEL SYSTEM AND METHOD

(71) Applicant: Transportation IP Holdings, LLC, Norwalk, CT (US)

(72) Inventors: Daniel George Norton, Niskayuna, NY (US); Adam Edgar Klingbeil, Ballston Lake, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 86 days.

(21) Appl. No.: 16/942,516

(22) Filed: Jul. 29, 2020

(65) Prior Publication Data

US 2020/0355131 A1 Nov. 12, 2020

Related U.S. Application Data

(60) Division of application No. 15/095,388, filed on Apr. 11, 2016, now abandoned, and a continuation-in-part (Continued)

(51) Int. Cl.
*F02D 41/00* (2006.01)
*F02D 19/08* (2006.01)
*F02D 29/02* (2006.01)

(52) U.S. Cl.
CPC ....... *F02D 41/0027* (2013.01); *F02D 19/081* (2013.01); *F02D 29/02* (2013.01); (Continued)

(58) Field of Classification Search
CPC .... F02D 41/0027; F02D 19/081; F02D 29/02; F02D 41/0025; F02D 2200/0625; F02D 2200/701; Y02T 10/30
(Continued)

(56) References Cited

U.S. PATENT DOCUMENTS 4,402,212 A 9/1983 Childs
4,495,930 A 1/1985 Nakajima
(Continued)

FOREIGN PATENT DOCUMENTS

CN 1701169 A 11/2005
CN 101201020 A 6/2008
(Continued)

OTHER PUBLICATIONS

Kessels, J. et al., "Integrated Energy & Emission Management for Hybrid Electric Truck with SCR aftertreatment," 2010 IEEE Vehicle Power and Propulsion Conference, Sep. 1, 2010, Lille, France, 6 pages.
(Continued)

*Primary Examiner* — Hung Q Nguyen
*Assistant Examiner* — John D Bailey
(74) *Attorney, Agent, or Firm* — McCoy Russell LLP

(57) ABSTRACT

A method provides for operating an engine configured to use a plurality of differing fuels. The method includes determining a fuel combustion ratio of the plurality of differing fuels associated with at least one engine cylinder of the engine based at least in part on one or more of a plurality of characteristic profiles. This maintains one or more of a plurality of actual values associated with usage of the plurality of differing fuels relative to defined corresponding threshold values. The fuel combustion ratio includes a ratio of the plurality of differing fuels to be delivered to the at least one engine cylinder. A fuel delivery system delivers the plurality of differing fuels to the at least one engine cylinder based on the fuel combustion ratio.

11 Claims, 4 Drawing Sheets

Related U.S. Application Data of application No. 15/013,432, filed on Feb. 2, 2016, said application No. 15/095,388 is a continuation-in-part of application No. 14/251,726, filed on Apr. 14, 2014, now Pat. No. 9,309,819, which is a continuation-in-part of application No. PCT/US2012/064929, filed on Nov. 14, 2012, said application No. 15/013,432 is a continuation-in-part of application No. 13/484,621, filed on May 31, 2012, now Pat. No. 9,249,744, said application No. PCT/US2012/064929 is a continuation of application No. 13/328,438, filed on Dec. 16, 2011, now Pat. No. 8,682,512.

(52) U.S. Cl.
CPC .. *F02D 41/0025* (2013.01); *F02D 2200/0625* (2013.01); *F02D 2200/701* (2013.01); *Y02T 10/30* (2013.01)

(58) Field of Classification Search
USPC ......................................................... 701/103
See application file for complete search history.

(56) References Cited

U.S. PATENT DOCUMENTS

| | | | |
|---|---|---|---|
| 5,560,326 A | 10/1996 | Merritt | |
| 5,713,328 A | 2/1998 | Anderson et al. | |
| 5,875,743 A | 3/1999 | Dickey | |
| 5,890,459 A | 4/1999 | Hedrick et al. | |
| 5,911,210 A | 6/1999 | Flach | |
| 6,101,986 A | 8/2000 | Brown et al. | |
| 6,276,334 B1 | 8/2001 | Flynn et al. | |
| 6,543,395 B2 | 4/2003 | Green | |
| 6,907,870 B2 | 6/2005 | zur Loye et al. | |
| 6,912,992 B2 | 7/2005 | Ancimer et al. | |
| 6,951,202 B2 | 10/2005 | Oda | |
| 7,019,626 B1 | 3/2006 | Funk | |
| 7,044,103 B2 | 5/2006 | May | |
| 7,069,910 B2* | 7/2006 | Surnilla | F02D 41/0275 123/481 |
| 7,107,942 B2 | 9/2006 | Weissman et al. | |
| 7,222,015 B2 | 5/2007 | Davis et al. | |
| 7,387,091 B2 | 6/2008 | Ritter | |
| 7,503,312 B2 | 3/2009 | Surnilla et al. | |
| 7,509,209 B2 | 3/2009 | Davis et al. | |
| 7,533,634 B2 | 5/2009 | Ritter et al. | |
| 7,549,408 B2 | 6/2009 | Russell | |
| 7,556,030 B2 | 7/2009 | Ashida et al. | |
| 7,640,913 B2 | 1/2010 | Blumberg et al. | |
| 7,740,000 B2 | 6/2010 | He et al. | |
| 7,861,518 B2 | 1/2011 | Federle | |
| 7,913,664 B2 | 3/2011 | Williams et al. | |
| 7,983,831 B2 | 7/2011 | Tsunooka | |
| 8,006,677 B2 | 8/2011 | Williams et al. | |
| 8,032,294 B2 | 10/2011 | Loeffler et al. | |
| 8,037,850 B2 | 10/2011 | Pursifull | |
| 8,112,218 B2* | 2/2012 | Russ | F02D 41/221 60/601 |
| 8,402,939 B2 | 3/2013 | Reuss et al. | |
| 8,555,702 B2 | 10/2013 | Sgatli et al. | |
| 8,584,657 B2 | 11/2013 | Yagi et al. | |
| 8,733,298 B2 | 5/2014 | Haskara et al. | |
| 8,893,691 B2 | 11/2014 | Payne et al. | |
| 9,157,385 B2 | 10/2015 | Gallagher et al. | |
| 9,249,744 B2 | 2/2016 | Klingbeil | |
| 9,334,841 B1 | 5/2016 | Jackson et al. | |
| 10,344,687 B2 | 7/2019 | Gallagher et al. | |
| 2002/0007816 A1 | 1/2002 | Zur Loye et al. | |
| 2003/0037978 A1 | 2/2003 | Hofbauer | |
| 2003/0221661 A1 | 12/2003 | Willi et al. | |
| 2004/0182378 A1 | 9/2004 | Oshimi et al. | |
| 2006/0032477 A1 | 2/2006 | May | |
| 2006/0102145 A1 | 5/2006 | Cohn et al. | |
| 2007/0079647 A1 | 4/2007 | Aoyama | |
| 2007/0095331 A1 | 5/2007 | Ayame | |
| 2007/0119425 A1* | 5/2007 | Lewis | F02D 19/0636 123/492 |
| 2007/0137514 A1 | 6/2007 | Kumar et al. | |
| 2007/0175459 A1* | 8/2007 | Williams | F02D 19/0694 123/515 |
| 2007/0295316 A1* | 12/2007 | Davis | F02D 19/0647 123/689 |
| 2008/0053399 A1 | 3/2008 | Bromberg et al. | |
| 2008/0096726 A1 | 4/2008 | Riley et al. | |
| 2008/0098726 A1 | 5/2008 | Donaldson et al. | |
| 2008/0110161 A1 | 5/2008 | Persson | |
| 2008/0110439 A1* | 5/2008 | Sugimoto | F02D 13/0234 123/478 |
| 2008/0121136 A1 | 5/2008 | Mari et al. | |
| 2008/0262701 A1 | 10/2008 | Williams et al. | |
| 2009/0025695 A1 | 1/2009 | Wolber et al. | |
| 2009/0271090 A1 | 10/2009 | Surnilla et al. | |
| 2009/0292444 A1 | 11/2009 | Russell | |
| 2010/0036582 A1* | 2/2010 | Kwiatkowski | F01L 7/026 701/103 |
| 2010/0162678 A1 | 7/2010 | Annigeri et al. | |
| 2010/0204903 A1* | 8/2010 | Nakatani | F02D 13/0203 123/90.15 |
| 2011/0015856 A1 | 1/2011 | Arnold | |
| 2011/0079197 A1 | 4/2011 | Stewart et al. | |
| 2011/0088654 A1 | 4/2011 | Courtoy et al. | |
| 2011/0114058 A1 | 5/2011 | Cohn et al. | |
| 2011/0118914 A1 | 5/2011 | Brooks et al. | |
| 2011/0132323 A1 | 6/2011 | Surnilla et al. | |
| 2011/0137470 A1 | 6/2011 | Surnilla et al. | |
| 2011/0184629 A1 | 7/2011 | Krengel et al. | |
| 2011/0209459 A1 | 9/2011 | Hancu et al. | |
| 2011/0257869 A1* | 10/2011 | Kumar | B61L 25/025 701/103 |
| 2011/0288738 A1 | 11/2011 | Donnelly et al. | |
| 2011/0288744 A1 | 11/2011 | Gokhale et al. | |
| 2011/0288751 A1 | 11/2011 | Kurtz | |
| 2012/0109496 A1 | 5/2012 | Hylands et al. | |
| 2012/0145122 A1 | 6/2012 | Kurtz et al. | |
| 2012/0158269 A1 | 6/2012 | Nakayama | |
| 2012/0272935 A1 | 11/2012 | Magnusson | |
| 2012/0324870 A1* | 12/2012 | Hoshi | F02D 19/061 60/285 |
| 2012/0325180 A1 | 12/2012 | Montgomery | |
| 2012/0325350 A1 | 12/2012 | Kim et al. | |
| 2013/0025573 A1 | 1/2013 | Klingbeil et al. | |
| 2013/0158752 A1 | 6/2013 | Norton | |
| 2013/0158848 A1 | 6/2013 | Gallagher et al. | |
| 2013/0325295 A1 | 12/2013 | Klingbeil | |
| 2014/0069384 A1 | 3/2014 | Suzuki et al. | |
| 2014/0261345 A1 | 9/2014 | Bromberg et al. | |
| 2016/0153375 A1 | 6/2016 | Klingbeil | |

FOREIGN PATENT DOCUMENTS

| | | |
|---|---|---|
| CN | 102400797 A | 4/2012 |
| DE | 19922748 A1 | 11/2000 |
| DE | 102004051287 A1 | 4/2006 |
| DE | 102006020223 B3 | 8/2007 |
| DE | 102010036131 A1 | 3/2012 |
| EP | 2336529 A2 | 6/2011 |
| JP | 2000145488 A | 5/2000 |
| JP | 2004108153 A | 4/2004 |
| JP | 2008274954 A | 11/2008 |
| JP | 2010065604 A | 3/2010 |
| RU | 2136918 C1 | 9/1999 |
| WO | 9421911 A1 | 9/1994 |
| WO | 03076788 A1 | 9/2003 |
| WO | 2007092711 A2 | 8/2007 |
| WO | 2011128692 A1 | 10/2011 |
| WO | 2011153069 A1 | 12/2011 |

OTHER PUBLICATIONS

Qian, D. et al., "Research of the Influence of Combustion Chamber Structure on Performance of Dual Fuel Engine," 2011 International

(56) References Cited

OTHER PUBLICATIONS

Conference on Electric Information and Control Engineering (ICEICE), Apr. 15, 2011, Wuhan, China, 3 pages.
ISA European Patent Office, International Search Report and Written Opinion Issued in Application No. PCT/US2012/064929, dated Mar. 6, 2013, WIPO, 10 pages.
ISA European Patent Office, International Search Report and Written Opinion Issued in Application No. PCT/US2013/047501, dated Nov. 6, 2013, WIPO, 12 pages.
Intellectual Property Office of the United Kingdom, Combined Search and Examination Report under Sections 17 & 18 (3) Issued in Application No. GB1309361.2, dated Nov. 25, 2013, 3 pages.
Mellde, R. et al., "Advanced automobile engines for fuel economy, low emissions, and multifuel capability," Annual Review of Energy, vol. 14. Jan. 1989, 20 pages.

\* cited by examiner

MULTI-FUEL SYSTEM AND METHOD

CROSS-REFERENCE TO RELATED APPLICATIONS

This application is a division of U.S. application Ser. No. 15/095,388, entitled "MULTI-FUEL SYSTEM AND METHOD," filed on Apr. 11, 2016, which is a continuation-in-part of U.S. Non-Provisional patent application Ser. No. 14/251,726, entitled, MULTI-FUEL SYSTEM AND METHOD, filed on Apr. 14, 2014, now U.S. Pat. No. 9,309,819, which is a continuation-in-part of International Application No. PCT/US2012/064929, entitled "FUEL OPTIMIZING SYSTEMS FOR A MOBILE ASSET, AND A RELATED METHOD THEREOF," filed on Nov. 14, 2012, which is a continuation of U.S. application Ser. No. 13/328,438, entitled, "FUEL OPTIMIZING SYSTEM FOR A MOBILE ASSET, AND A RELATED METHOD THEREOF," filed on Dec. 16, 2011, now U.S. Pat. No. 8,682,512. This application is also a continuation-in-part of U.S. Non-Provisional patent application Ser. No. 15/013,432, entitled "METHOD FOR OPERATING AN ENGINE," filed on Feb. 2, 2016, which is a continuation-in-part of U.S. Non-Provisional patent application Ser. No. 13/484,621, entitled "METHOD FOR OPERATING AN ENGINE," filed on May 31, 2012, now U.S. Pat. No. 9,249,744. The entire contents of each of the above-referenced applications are hereby incorporated by reference for all purposes.

BACKGROUND

Technical Field

Aspects of the invention relate to a multi-fuel system for engines and an associated method of operation.

Discussion of Art

Some mobile assets may have engines, for example, compression-ignition engines operate by directly injecting a fuel (e.g., diesel fuel) into compressed air in one or more piston-cylinder assemblies, such that the heat of the compressed air ignites the fuel-air mixture. The direct fuel injection atomizes the fuel into droplets, which evaporate and mix with the compressed air in the combustion chambers of the piston-cylinder assemblies. The fuel-air ratio affects engine performance, efficiency, exhaust constituents, and other engine characteristics. Exhaust emissions may include carbon oxides (e.g., carbon monoxide), nitrogen oxides (NOx), sulfur oxides (SOx), and particulate matter (PM). The amount and relative proportion of these constituents may vary in response to changes in the fuel-air mixture, fuel quality, compression ratio, injection timing, environmental conditions (e.g., atmospheric pressure, temperature, etc.), and so forth.

A dual-fuel engine is an alternative internal combustion engine designed to run on more than one fuel, for example, natural gas and diesel, each stored in separate vessels. Such engines are capable of burning a mixture of the resulting blend of fuels in the combustion chamber and the fuel injection or spark timing may be adjusted according to the blend of fuels in the combustion chamber. For dual fuel operation where one of the fuel is premixed with air, a reduction in nitrogen oxide (NOx) and particulate matter (PM) emissions is enabled by combusting a relatively larger fraction of the premixed fuel. It may be desirable to have a system and method for engines operating on more than one fuel that differs from those currently available.

BRIEF DESCRIPTION

In accordance with one embodiment, a method is provided for operating an engine configured to use a plurality of differing fuels. The method includes determining a fuel combustion ratio of the plurality of differing fuels associated with at least one engine cylinder of the engine based at least in part on one or more of a plurality of characteristic profiles. This is to maintain one or more of a plurality of actual values associated with usage of the plurality of differing fuels relative to defined corresponding threshold values. The fuel combustion ratio includes a ratio of the plurality of differing fuels to be delivered to the at least one engine cylinder. A fuel delivery system delivers the plurality of differing fuels to the at least one engine cylinder based on the fuel combustion ratio.

In one embodiment, a fuel system is provided that includes a fuel controlling unit. The fuel controlling unit delivers a plurality of fuels to at least one engine cylinder of an engine based at least in part on a fuel combustion ratio. The fuel combustion ratio comprises a ratio of the plurality of fuels to be delivered to the at least one engine cylinder and is based at least in part on one or more of a plurality of characteristic profiles. The fuel controlling unit maintains one or more of a plurality of actual values associated with usage of the plurality of fuels relative to defined corresponding threshold values.

In one embodiment, an engine is disposed within a mobile asset operable to travel along a defined path. A global positioning sensor provides, and the fuel controlling unit receives from the global positioning sensor, location information and thereby determines the one or more of the plurality of characteristic profiles as a function of time and a corresponding location of the mobile asset along the defined path.

DRAWINGS

These and other features and aspects of the invention may be understood when the following detailed description is read with reference to the accompanying drawings in which like characters represent like parts throughout the drawings, wherein.

DETAILED DESCRIPTION

In accordance with the embodiments discussed herein, a method and a fuel system for use operating an engine using a plurality of fuels is disclosed. The engine may power or propel a stationary asset or a mobile asset.

A suitable mobile asset can be a vehicle or other engine powered assembly. Suitable vehicles may include locomotives, passenger and non-passenger automotive vehicles, hybrid vehicles, off-highway vehicles, on-road vehicles (such as tractor trailers), tracked vehicles, air-borne vehicles, rail vehicles, mining vehicles, industrial and construction vehicles, and marine vessels. Suitable mobile assets may use other fuels instead of diesel and natural gas. Other suitable liquid fuels may include gasoline, kerosene, ethanol, biodiesel, and the like. Other suitable gaseous fuels may include propane, hydrogen, syn-gas, and the like.

A mobile asset's configuration may include performance variables such as the peak output rating of the mobile asset, the correlation between the power level settings and the percentage of full power generated, engine emissions curves, acoustic emissions, electro-magnetic emissions, the number of traction motors used, fuel economy performance, adhesion limits, the organization, presentation and functionality of operator controls, communications protocol, auxiliary functions, security measures, and the like. External factors that can affect the mobile asset's desired configuration can include tax liabilities for operation, weather considerations, damage risk (due to crime or conflict), proximity to population centers, and the like. The control of fuel usage may be determined with reference to various characteristic profiles associated with the engine operation and/or mobile asset and may vary as a function of time and a corresponding location of the asset along the path.

A reduction in nitrogen oxide (NOx) and particulate matter (PM) emissions may be enabled by combusting a relatively larger fraction of premixed fuel. Relative costs and availability of different fuels may be in flux. For example, in some embodiments, diesel and natural gas may be utilized to drive the engine. If the cost of diesel increases relative to the cost of the natural gas, more natural gas may be used resulting in reduced cost and emissions. If the cost of natural gas increases relative to the cost of the diesel, then more diesel may be used to drive the engine.

The term "profiles" is used herein to describe the overall operating parameters and conditions of the engine and/or mobile asset. These profiles may alter the manner in which the operating systems of the mobile asset can be controlled in response to operational inputs.

Figure 1:
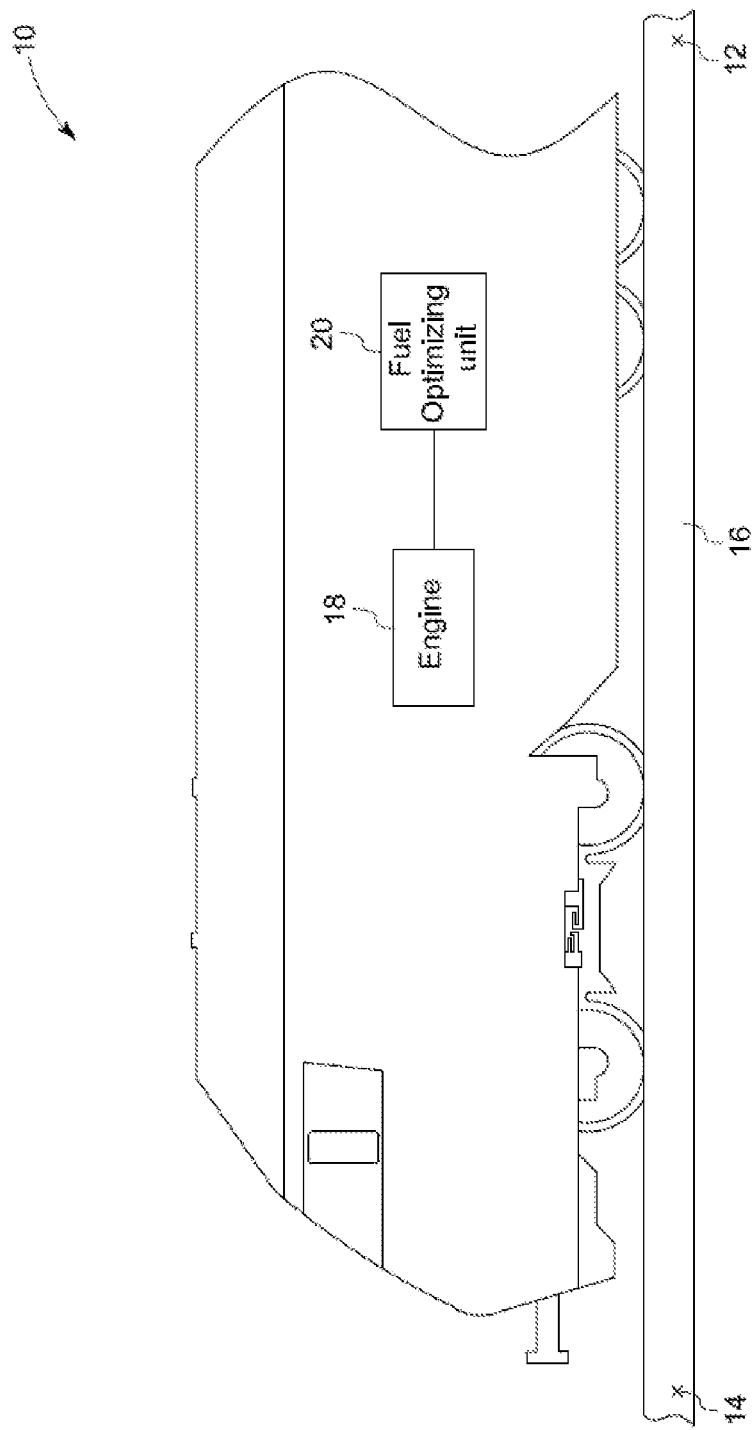
FIG. 1 is a diagrammatical representation of a mobile asset, for example a locomotive, having a fuel controlling unit in accordance with an exemplary embodiment of the present invention.

Referring to FIG. 1, a mobile asset 10 moving from a first operating point 12 to a second operating point 14 along a defined path 16 is disclosed. In the illustrated embodiment, the mobile asset may be driven by an engine 18 using a plurality of fuels. A fuel controlling unit 20 may control fuel utilization based on cost and availability while ensuring emission compliance along the travel from the first operating point to the second operating point along the defined path.

Figure 2:
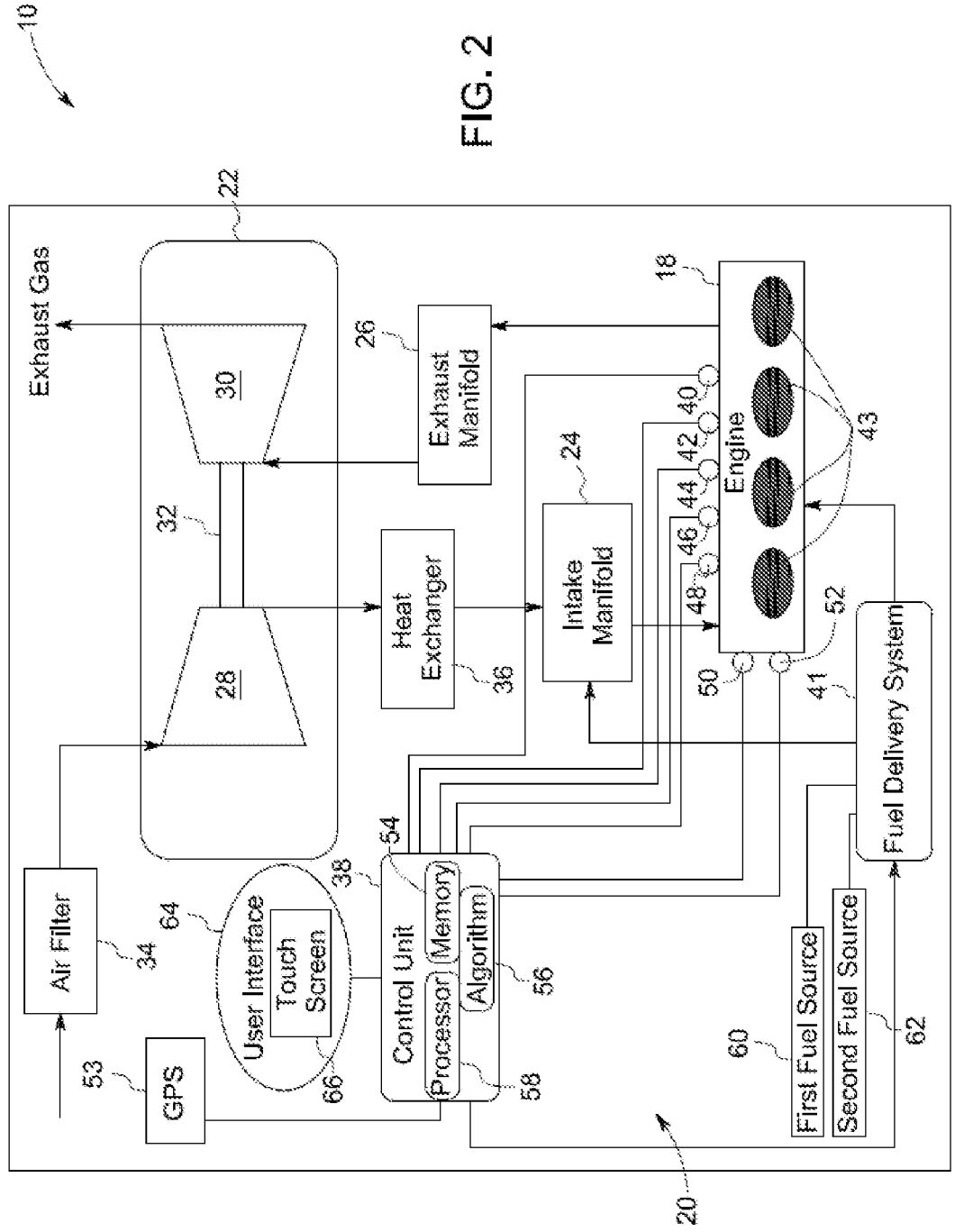
FIG. 2 is a diagrammatical representation of a mobile asset with detailed view of a fuel controlling unit in accordance with an exemplary embodiment of the present invention.

Referring to FIG. 2, the mobile asset includes a turbocharger 22 and the compression-ignition engine, e.g. the diesel engine. A motor-generator unit (not shown) may be mechanically coupled to the turbocharger. As discussed in further detail below, embodiments of the technique provide monitoring and control features, such as sensors and control logic, to control/control the utilization of fuel.

The illustrated engine includes an air intake manifold 24 and an exhaust manifold 26. The turbocharger includes a compressor 28 and a turbine 30 and may be operated to supply compressed air to the intake manifold for combustion within the engine. The turbine may be coupled to the exhaust manifold for extracting energy from exhaust gases for rotating a turbocharger shaft 32 connected to the compressor. The compressor draws ambient air through a filter 34 and provides compressed air to a heat exchanger 36. The temperature of air may be increased due to compression. The compressed air flows through the heat exchanger such that the temperature of air may be reduced prior to delivery into the intake manifold of the engine. In one embodiment, the heat exchanger may be an air-to-water heat exchanger, which utilizes a coolant to facilitate removal of heat from the compressed air. In another embodiment, the heat exchanger may be an air-to-air heat exchanger, which utilizes ambient air to facilitate removal of heat from compressed air. The fuel controlling unit may be used for another type of engine or mobile asset using a plurality of fuels so as to control fuel utilization based on cost and availability while ensuring emission compliance during travel.

The fuel controlling unit may include a plurality of sensors and a control unit 38. Suitable sensors may include one or more of an engine emission level sensor 40, a fuel usage level sensor 42, a power output sensor 44, an engine load sensor 46, an engine speed sensor 48, fuel cost meter 50, a fuel injection profile sensor 52, a knock sensor (not shown), an oxygen content sensor (not shown), temperature sensors (not shown), pressure sensors (not shown), a valve sensor (not shown), and the like. A global positioning sensor (GPS) 53 may communicate with the fuel controlling unit.

A suitable control unit may be an electronic fuel injection control unit for the engine or an electronic logic control unit that may be programmable by a user. The control unit may produce a signal to control operation of a fuel delivery system 41. The fuel delivery system may have one or more fuel injection pumps, gas control valves, a communication path to regasification unit (which, in one embodiment, may be located on another mobile asset coupled to the mobile asset that supports the engine and the fuel controlling unit), a gas recirculation pump, and the like. The fuel injection pumps may provide fuel, under pressure, to a plurality of plurality of fuel injectors (not shown) for injecting fuel into a cylinder of the engine.

A piston (not shown) may be slidably disposed in each cylinder and reciprocates between a top dead center and a bottom dead center position. The control unit may receive an engine emission level signal from the level sensor, a fuel usage level signal from the sensor, a power output signal from the power sensor, an engine load signal from the load sensor, an engine speed signal from the speed sensor, fuel cost from the meter, and a fuel injection profile signal from the injection sensor.

The control unit may receive one or more signals associated with at least one of a distance from the first operating point to the second operating point along the defined path, terrain profile associated with the path, ambient temperature and pressure, time required to traverse the distance, and location of one or more fuel stations along the defined path from the GPS unit. The terrain profile can include information relating to the path, such as the grade, the curvature, the altitude, and the path condition. Path condition can include the state of repair or wear of the path, for example the condition of rail track.

The control unit may include a memory 54, an algorithm 56, and a processor 58. The memory may store information associated with the mobile asset, the path, the engine, environmental conditions (such as snow during a winter or leaf cover in the fall), and the like. The memory may store information relating to average temperatures and pressures associate with either the ambient or of operations of the engine. Other stored information may include maps, tables and models relating to, for example, fuel injection timing and pressure, engine speed, power output of the engine, engine emission level, fuel usage level, engine load, fuel cost, distance from the first operating point to the second operating point along the defined path, terrain profile associated with the path, ambient temperature and pressure, time required to traverse the distance, and location of one or more fuel stations along the defined path, or the like.

Regarding injection timing, more than diesel fuel is contemplated herein and the term is used to indicate aspects of fuel flow (both gas and liquid) into the cylinder relative to the combustion cycle. Thus, injection timing information may include a duration that a solenoid opens in the injector to ingress fuel into the cylinder, the pressure of the fuel being injected, the timing of the injection relative to the piston location in the cylinder, and the like. Additionally, injection timing may additionally refer to the fumigation or injection of gaseous fuel into the air intake valve for the cylinder. In this aspect, injection timing may refer to the flow rate of the gas, the volume of EGR in the manifold, the oxygen content (calculated or measured) in the manifold, and the like. Furthermore, the memory may store actual sensed/detected information from the above-mentioned sensors.

The algorithm facilitates the processing of signals from one or more of the plurality of sensors. The characteristic profiles associated with the mobile asset may include the output from the sensors and information stored in the memory.

The processor may include a range of circuitry types, such as a microprocessor, a programmable logic controller, a logic module, etc. The processor in combination with the algorithm may perform the various computational operations relating to determination of a combustion ratio of the plurality of fuels to be delivered to at least some cylinders of the engine. The combustion ratio is determined by the ratio of the plurality of fuels delivered to cylinders of the engine. For an engine using diesel and natural gas, a combustion ratio would be ratio of diesel content to natural gas content to be delivered to each cylinder. As noted, the diesel content may be measured as an injection time and diesel pressure through an injector. The natural gas content may be measured by a flow rate through a gas valve as metered into an air intake stream. The ratio, then, could be selected as the energy content of each fuel component present in a cylinder during combustion. Alternatively, other calculations may be used to form the ratio.

The processor may determine the fuel combustion ratio of the plurality of the fuels associated with each engine cylinder of the mobile asset based on the plurality of characteristic profiles. In some embodiments, the processor determines the combustion ratio based on the output from the sensors 40, 42, 44, 46, 48, 50 and 52. In certain other embodiments, the processor 58 determines the combustion ratio based on the output from the GPS 53. In a specific embodiment, the processor 58 utilizes information from the GPS 53 in conjunction with the information from the other sensors 40, 42, 44, 46, 48, 50 and 52 to determine the combustion ratio. Additionally, the processor 58 may also use the information stored in the memory 54.

In the illustrated embodiments, the mobile asset has a first fuel source 60 and a second fuel source 62 for feeding a first fuel and a second fuel respectively, to corresponding cylinders of the engine. The first and second fuels may be injected to the cylinders via the intake manifold or may be injected directly to the cylinders, or a combination of both or other ingress techniques. More than two fuels may be used.

The processor outputs a control signal to the fuel delivery system to deliver the plurality of fuels to the cylinders based on, at least partially, the combustion ratio. The combustion ratio may be determined to maintain a plurality of actual values associated with usage of the plurality of fuels relative to defined corresponding threshold values. In one embodiment, an actual cost associated with usage of the plurality of fuels may be maintained to less than or equal to a defined threshold cost; an actual emission level associated with usage of the plurality of fuels may be maintained to less than or equal to a defined threshold emission level; and, an actual quantity of fuel in the mobile asset may be maintained to less than or equal to a defined threshold quantity. The fuel controlling unit may control fuel utilization, and the ratio of use of the plural fuels relative to each other, based on cost and availability while ensuring emission compliance along the entire travel from the first operating point to the second operating point along the defined path. For example, if two fuels are used, the controlling unit may control a relatively larger usage of a secondary fuel and so that adequate primary fuel exists to complete the travel, taking into consideration the characteristics profiles.

Relative costs, purity, type and availability of different fuels may be in flux. Also, proportions of different fuels may also have an effect on the exhaust constituents from the engine. In one embodiment, the fuel controlling unit takes into consideration sensed engine emission level, a fuel usage level (i.e. quantity of fuel required for the travel, remaining quantity of fuel in the fuel sources 60, 62) the engine power output, the engine load, the engine speed, fuel cost, and the fuel injection profile. In an embodiment, the fuel controlling unit may consider distance from the first operating point to the second operating point along the defined path, terrain profile associated with the path, ambient temperature and pressure, time required to traverse the distance, and location of one or more fuel stations along the defined path, or the like. Other suitable parameters may be also envisaged.

Parameters may vary dynamically as a function of time and location of asset. In accordance with an embodiment, the plurality of characteristic profiles associated with the mobile asset may be determined as a function of time and a corresponding location of the mobile asset along the defined path. Hence, the fuel controlling unit may also determine the fuel combustion ratio as a function of time and a corresponding location of the mobile asset based on the one or more of the plurality of characteristic profiles. The frequency of sensing the characteristics profiles and determination of the combustion ratio may be based on the type of application.

In certain embodiments, the control unit may output data to a user interface 64. The user interface may facilitate inputs via a touch screen 66 from a user to the control unit and provide a mechanism through which a user can manipulate data and sensed properties from the control unit. The user interface may include a command line interface, menu driven interface, and/or graphical user interface. The control unit may be operable to adjust the combustion ratio affecting the cost and engine emissions associated with the fuel usage. In some embodiments, the control unit may communicate to a user via the user interface whether it may be possible to reach a predetermined destination with available of fuel(s) in the asset, while meeting emissions targets.

As described above, the control unit may measure a plurality of engine parameters based on output from a variety of sensors, including but not limited to fuel injection timing sensors, fuel flow sensors, throttle position sensors, manifold air pressure sensors, manifold air temperature sensors, exhaust gas temperature sensors, engine power sensors, knock sensors or the like. Thus, in non-limiting examples, the measured engine parameters may comprise at least one of engine speed, engine load, engine throttle position, intake manifold temperature, intake manifold pressure, exhaust gas flow rate and temperature, air flow into the cylinder, compression ratio, or intake and exhaust valve timing.

In other embodiments, examples of other engine parameters may comprise a status of one or more sensors. For example, a measured engine parameter may comprise if a particular sensor (e.g., knock sensor, temperature sensor, etc.) is broken or not operating correctly.

In still another embodiment, another engine parameter may comprise an aftertreatment status. The aftertreatment status may comprise temperature, flow, and/or pressure drop of a predetermined quantity, whether the aftertreatment is regenerating, measured engine operation over time, anticipated regeneration start event, estimated collection of flammable substances in the aftertreatment system, and the like.

Figure 3:
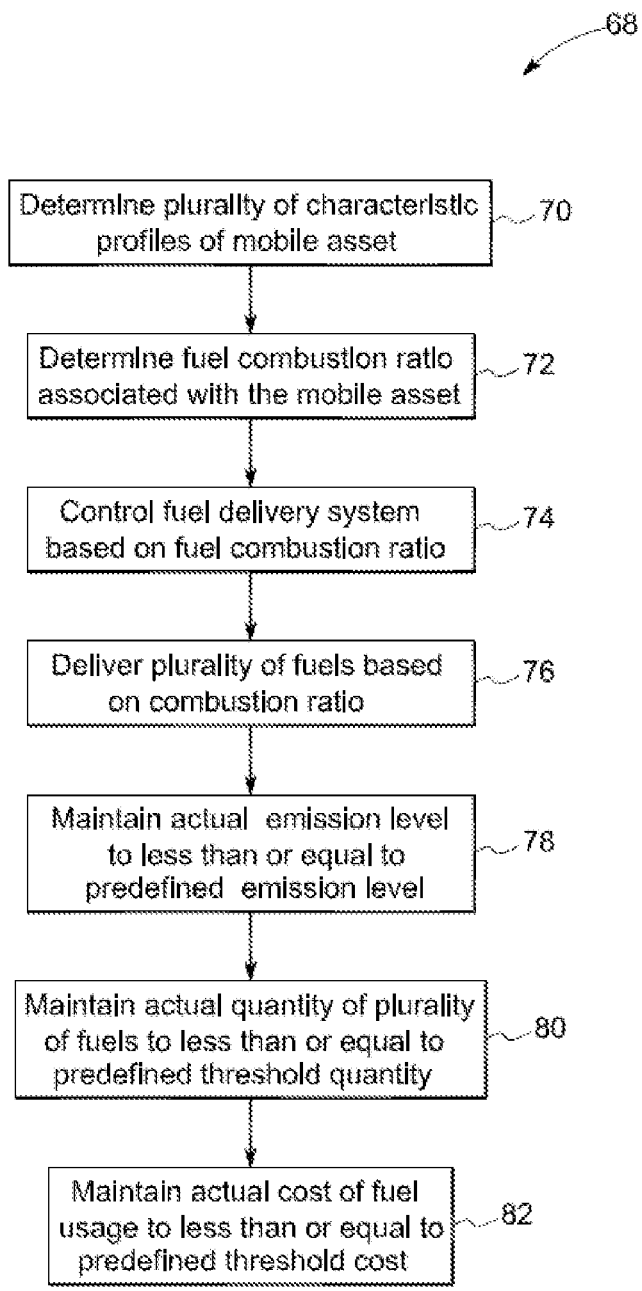
FIG. 3 is a flow diagram illustrating exemplary steps involved in optimization of fuel in a mobile asset in accordance with an exemplary embodiment of the present technique.

Referring to FIG. 3, a flow diagram 68 illustrating a plurality of steps involved in optimization of fuel for a mobile asset may be disclosed. Initially, a plurality of characteristic profiles associated with the mobile asset moving from one operating point to another operating point along a defined path may be determined as represented by the step 70. In one embodiment, the characteristic profiles may include asset sensed information, the characteristics profiles may include GPS information, the characteristics profile may include memory stored information, and the characteristics profile may be determined as a function of time and location of the mobile asset. In one example, the plurality of characteristic profiles comprises one or more of global positioning sensor (GPS) information for the location of the mobile asset, a calculated distance from a current location of the mobile asset to a fuel station, a fuel cost for one or more of the plurality of fuels, a terrain profile associated with a location on the defined path, or an ambient temperature or ambient pressure proximate to the mobile asset. On an example, the plurality of characteristic profiles may include two of the above parameters. In an alternate or additional example, the plurality of characteristic profiles comprises at least one asset sensed information comprising at least one of an engine emission level, a fuel usage level, a power output, an engine load, an engine speed, or a fuel injection profile.

Then, a fuel combustion ratio of the plurality of the fuels associated with at least one engine cylinder of the mobile asset may be determined based on the plurality of characteristic profiles as represented by the step 72. The fuel combustion ratio refers to a ratio of the plurality of fuels to be delivered to the at least one engine cylinder of the mobile asset, and may be determined as a function of time and location of the mobile asset.

A fuel delivery system may be controlled based on the determined fuel combustion ratio as represented by the step 74. The fuel delivery system delivers the plurality fuels based on the determined fuel combustion ratio as represented by the step 76. As a result, the actual emission level associated with usage of the plurality of fuels may be maintained to less than or equal to a defined threshold emission level as represented by the step 78. For example, a measured exhaust emission constituent level may be controlled relative to a defined threshold emission level. An actual quantity of the plurality of fuels in the mobile asset may be maintained less than or equal to a defined threshold quantity as represented by the step 80. The actual cost associated with usage of the plurality of fuels may be maintained to less than or equal to a defined threshold cost as represented by the step 82.

Figure 4:
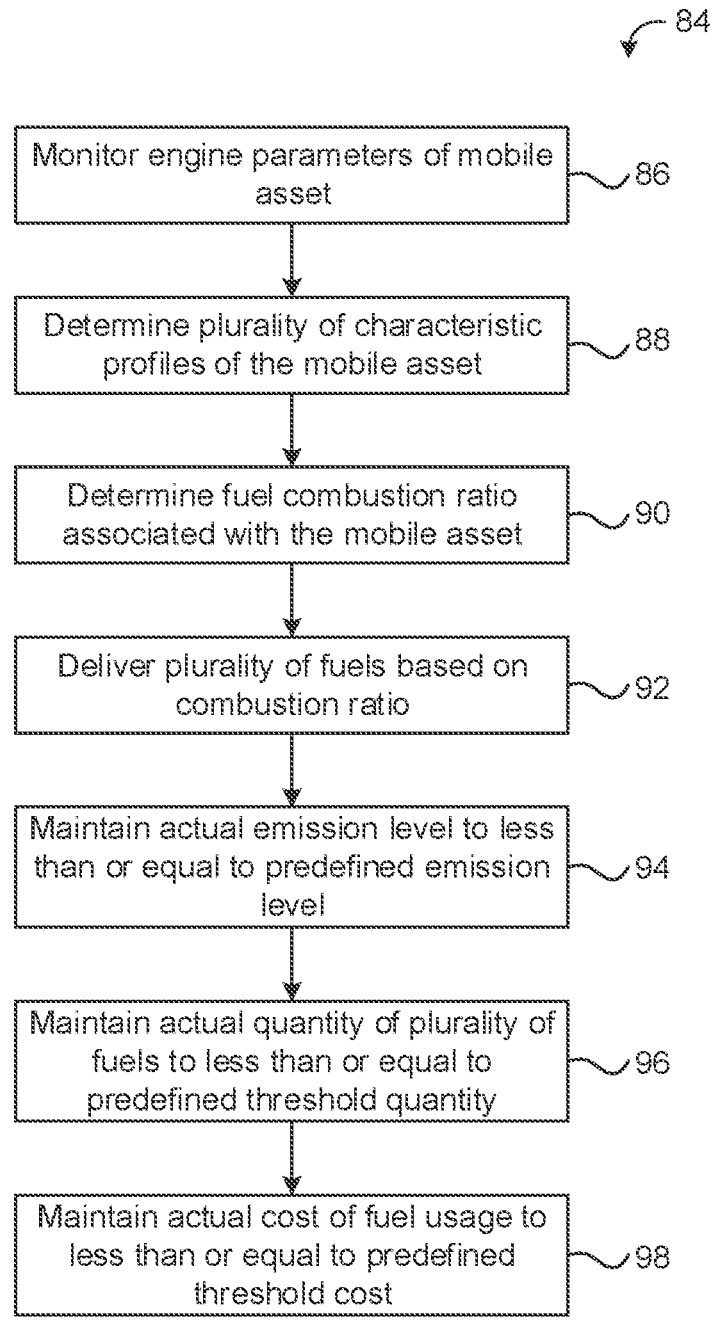
FIG. 4 is a flow diagram illustrating exemplary steps involved in optimization of fuel in a mobile asset in accordance with an exemplary embodiment of the present technique.

Referring to FIG. 4, a flow diagram 84 illustrating a plurality of steps involved in optimization of fuel for a mobile asset may be disclosed. A plurality of engine parameters may be monitored as represented by the step 86, including measuring the engine parameters via one or more sensors and/or calculating or estimating the engine parameters. The measured engine parameters may include engine speed, engine load, engine throttle position, intake manifold temperature, intake manifold pressure, exhaust gas flow rate and temperature, air flow into the cylinder, compression ratio, intake and exhaust valve timing, sensor status (e.g., knock sensor status), and aftertreatment status.

A plurality of characteristic profiles associated with the mobile asset moving from one operating point to another operating point along a defined path may be determined as represented by the step 88. In one embodiment, the characteristic profiles may include asset sensed information, the characteristics profiles may include GPS information, the characteristics profile may include memory stored information, and the characteristics profile may be determined as a function of time and location of the mobile asset. In one example, the plurality of characteristic profiles comprises one or more of global positioning sensor (GPS) information for the location of the mobile asset, a calculated distance from a current location of the mobile asset to a fuel station, a fuel cost for one or more of the plurality of fuels, a terrain profile associated with a location on the defined path, or an ambient temperature or ambient pressure proximate to the mobile asset. In an example, the plurality of characteristic profiles may include two of the above parameters. In an alternate or additional example, the plurality of characteristic profiles comprises at least one asset sensed information comprising at least one of an engine emission level, a fuel usage level, a power output, an engine load, an engine speed, or a fuel injection profile. In a further example, the plurality of characteristic profiles may additionally or alternatively comprise one or more of historical operational data or ambient conditions along the defined path. The historical operational data may include historical fuel usage levels for the plurality of fuels supplied to the engine in order to traverse the defined path, historical ambient conditions (e.g., historical pressure and temperature), historical path conditions (e.g., track wear), and/or other operational data.

Then, a fuel combustion ratio of the plurality of the fuels associated with at least one engine cylinder of the mobile asset may be determined based on the measured engine parameters and the plurality of characteristic profiles as represented by the step 90. The fuel combustion ratio refers to a ratio of the plurality of fuels to be delivered to the at least one engine cylinder of the mobile asset, and may be determined as a function of time and location of the mobile asset.

A fuel delivery system may be controlled based on the determined fuel combustion ratio. The fuel delivery system delivers the plurality fuels based on the determined fuel combustion ratio as represented by the step 92. As a result, the actual emission level associated with usage of the plurality of fuels may be maintained to less than or equal to a defined threshold emission level as represented by the step 94. An actual quantity of the plurality of fuels in the mobile asset may be maintained less than or equal to a defined threshold quantity as represented by the step 96. The actual cost associated with usage of the plurality of fuels may be maintained to less than or equal to a defined threshold cost as represented by the step 98.

In one example, one of the one or more monitored engine parameters includes an increased load operation of the engine. The increased load operation may include a transient acceleration operation. During the transient acceleration operation, the fuel combustion ratio may be adjusted to avoid knock, for example. In an example, the quantity of a first fuel may be reduced and the quantity of the second fuel may be increased.

In an example, the increased load operation may include or be due to an increased gradient of the path at the mobile asset current location. In one example, the control unit may determine in advance that an increased gradient is coming up along the path and then pre-stage the engine to anticipate the increased load. The pre-staging may include switching hardware configurations of the engine. The hardware configurations that may be switched include one or more of a valve event (e.g., adjusting one or more of timing, lift, or duration of an intake and/or exhaust valve), compression ratio, piston, piston ring, valve lift profile, pressure sensor, temperature sensor, knock sensor, injector, and injector nozzle.

In a further example, one of the one or more monitored engine parameters includes an aftertreatment status where the aftertreatment system may suffer damage as a result of a sudden increase in temperature beyond a limited temperature (e.g., temperature point, rate of rise, etc.). This may be in conjunction with extended idle or cold operation. For example, the status of the aftertreatment may be that the aftertreatment has accumulated a large amount of flammable material including oil, unburned fuel, and/or particulate. Alternatively, the status of the aftertreatment may be that it is at a relatively low temperature and would suffer from extreme thermal stresses in the event of a sudden increase in temperature. In this embodiment, the fueling may be adjusted such that the temperature of the aftertreatment is controlled to prevent damage.

In an example, one of the one or more monitored engine parameters includes a sensor status for a temperature sensor or a knock sensor. For example, if a particular sensor (e.g., knock sensor, temperature sensor, etc.) is broken or not operating correctly, the fuel combustion ratio may be adjusted to proactively prevent knocking that might otherwise go undetected.

In an example, one of the one or more monitored engine parameter comprises increased engine speed. During the increased engine speed operation, the fuel combustion ratio may be adjusted to avoid knock, for example. In an example, the quantity of a first fuel may be reduced and the quantity of the second fuel may be increased.

In one embodiment, a method includes determining a plurality of characteristic profiles associated with a mobile asset moving from a first operating point to a second operating point along a defined path. A fuel combustion ratio is determined for the plurality of the fuels associated with at least one engine cylinder of the mobile asset based on the plurality of characteristic profiles so as to maintain a plurality of actual values associated with usage of the plurality of fuels to less than or equal to defined corresponding threshold values. The fuel combustion ratio is a ratio of the plurality of fuels to each other, and may be calculated in one of several ways depending on the application. As used here, suitable determination methods may include by measured volume, mass, flow rate, injection time, and the like, and may take into account purity, energy density, the presence, type and quantify of fuel additives, environmental considerations, EGR content, and the like. A fuel delivery system of the mobile asset may deliver the plurality of fuels to the at least one engine cylinder based on the fuel combustion ratio.

In an example, a fuel system includes a fuel controlling unit configured to deliver a plurality of differing fuels to at least one engine cylinder of an engine based at least in part on a fuel combustion ratio, wherein the fuel combustion ratio comprises a ratio of the plurality of fuels to be delivered to the at least one engine cylinder and is based at least in part on one or more of a plurality of characteristic profiles along a defined path of a mobile asset in which the engine is disposed, wherein the fuel combustion ratio comprises a ratio of the plurality of fuels to be delivered to the at least one engine cylinder, and the plurality of characteristic profiles comprises one or more of global positioning sensor (GPS) information for the location of the mobile asset, a calculated distance from a current location of the mobile asset to a fuel station, a fuel cost for one or more of the plurality of fuels, a terrain profile associated with a location on the defined path, or an ambient temperature or ambient pressure proximate to the mobile asset.

The system may further comprise one or more sensors operable to communicate sensor information with the fuel controlling unit sensor information, and the fuel controlling unit may be operable to receive the sensor information and thereby to determine the one or more of the plurality of characteristic profiles. The fuel controlling unit may be configured to signal a fuel demand to a regasification unit to supply at least one of the plurality of fuels. The fuel controlling unit may be configured to maintain an actual quantity of at least one of the plurality of fuels in the mobile asset to less than or equal to a defined threshold quantity for that fuel. The plurality of characteristic profiles may further comprise one or more of historical operational data or ambient conditions along the defined path. In an example, the mobile asset in which the engine is disposed is a vehicle. In an example, the vehicle is a rail vehicle, and the plurality of differing fuels include diesel and natural gas.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, and to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for operating an engine configured to use a plurality of differing fuels, the method comprising:
monitoring a plurality of engine parameters, the plurality of engine parameters including an increased load operation of the engine and a knock sensor status, wherein monitoring the knock sensor status includes monitoring whether a knock sensor is operating correctly;
determining a fuel combustion ratio of the plurality of differing fuels associated with at least one engine cylinder of the engine based at least in part on the increased load operation, the knock sensor status, and a plurality of characteristic profiles along a defined path of a mobile asset in which the engine is disposed, wherein the fuel combustion ratio comprises a ratio of the plurality of differing fuels to be delivered to the at least one engine cylinder, and the plurality of characteristic profiles comprises at least one respective calculated distance from a current location of the mobile asset to at least one fuel station and at least one fuel cost for one or more of the plurality of differing fuels;
monitoring a status of an aftertreatment device;
if a predetermined condition of the aftertreatment device is met, adjusting the determined fuel combustion ratio to maintain aftertreatment device temperature below a threshold temperature; and
controlling a fuel delivery system to deliver the plurality of differing fuels to the at least one engine cylinder based on the determined fuel combustion ratio.

2. The method of claim 1, wherein the at least one respective calculated distance comprises plural calculated distances, the at least one fuel station comprises plural fuel stations, and wherein the calculated distances are from the current location of the mobile asset to the plural fuel stations, respectively, and the at least one fuel cost comprises plural fuel costs for the plurality of differing fuels at the plural fuel stations.

3. The method of claim 1, wherein the plurality of characteristic profiles comprises at least one asset sensed information comprising at least one of an engine emission level, a fuel usage level, a power output, an engine load, an engine speed, or a fuel injection profile and wherein the predetermined condition of the aftertreatment device includes the aftertreatment device temperature being below a second threshold temperature.

4. The method of claim 1, wherein the predetermined condition of the aftertreatment device includes a load on the aftertreatment device exceeding a threshold load, and further comprising controlling a measured exhaust emission constituent level relative to a defined threshold emission level.

5. A method for operating an engine configured to use a plurality of differing fuels, the method comprising:
monitoring a plurality of engine parameters, the plurality of engine parameters including an increased load operation of the engine and a knock sensor status, wherein monitoring the knock sensor status includes monitoring whether a knock sensor is operating correctly;
determining a fuel combustion ratio of the plurality of differing fuels associated with at least one engine cylinder of the engine based at least in part on the increased load operation, the knock sensor status, and one or more of a plurality of characteristic profiles along a defined path of a mobile asset in which the engine is disposed, wherein the fuel combustion ratio comprises a ratio of the plurality of differing fuels to be delivered to the at least one engine cylinder, and the plurality of characteristic profiles comprises one or more of global positioning sensor (GPS) information for a current location of the mobile asset, a calculated distance from the current location of the mobile asset to a fuel station, a fuel cost for one or more of the plurality of differing fuels, a terrain profile associated with a location on the defined path, or an ambient temperature or ambient pressure proximate to the mobile asset;
controlling a fuel delivery system to deliver the plurality of differing fuels to the at least one engine cylinder based on the determined fuel combustion ratio;
determining if the increased load operation corresponds to an increased gradient of the defined path at the current location of the mobile asset; and
determining in advance that the increased gradient is coming up along the defined path and pre-staging the engine to anticipate the increased load operation, the pre-staging including switching hardware configurations comprising one of an intake and/or exhaust valve event, or compression ratio.

6. The method of claim 5, wherein the increased load operation comprises a transient acceleration operation.

7. The method of claim 5, wherein one of the plurality of monitored engine parameters comprises an aftertreatment status.

8. The method of claim 5, wherein one of the plurality of monitored engine parameters further comprises a temperature sensor status.

9. The method of claim 5, wherein one of the plurality of monitored engine parameters comprises increased engine speed.

10. The method of claim 5, further comprising determining that the knock sensor is not operating correctly, and adjusting the fuel combustion ratio to proactively prevent knocking.

11. A method for operating an engine configured to use a plurality of differing fuels, the method comprising:
monitoring a plurality of engine parameters, the plurality of engine parameters including an increased load operation of the engine and a knock sensor status, wherein monitoring the knock sensor status includes monitoring whether a knock sensor is operating correctly;
determining that the knock sensor is not operating correctly;
determining a fuel combustion ratio of the plurality of differing fuels associated with at least one engine cylinder of the engine based at least in part on the increased load operation, the knock sensor not operating correctly, and a plurality of characteristic profiles along a defined path of a mobile asset in which the engine is disposed,
wherein determining the fuel combustion ratio includes adjusting the fuel combustion ratio to proactively prevent knocking responsive to the knock sensor not operating correctly,
wherein the fuel combustion ratio comprises a ratio of the plurality of differing fuels to be delivered to the at least one engine cylinder,
wherein the plurality of characteristic profiles comprises at least one respective calculated distance from a current location of the mobile asset to at least one fuel station and at least one fuel cost for one or more of the plurality of differing fuels; and controlling a fuel delivery system to deliver the plurality of differing fuels to the at least one engine cylinder based on the determined fuel combustion ratio.

* * * * *